(No Model.)
E. KRONENBERG & C. WOLTERS.
LIQUID METER.
No. 327,956. Patented Oct. 6, 1885.
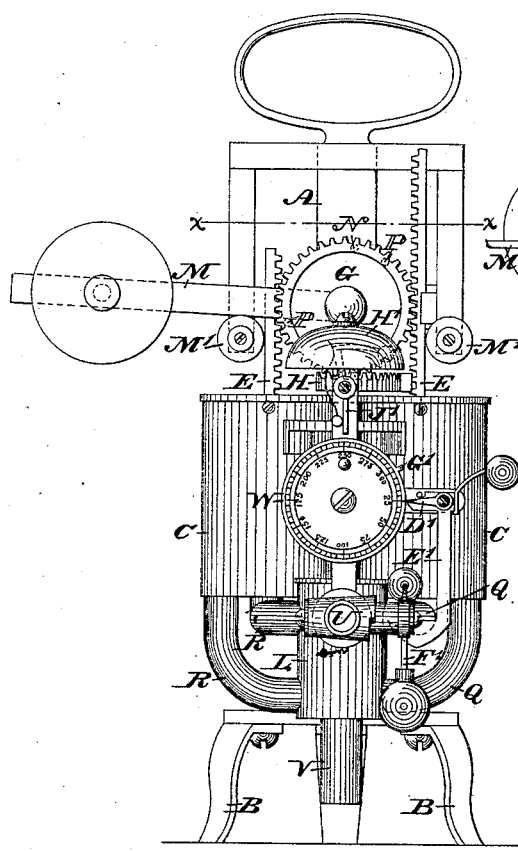
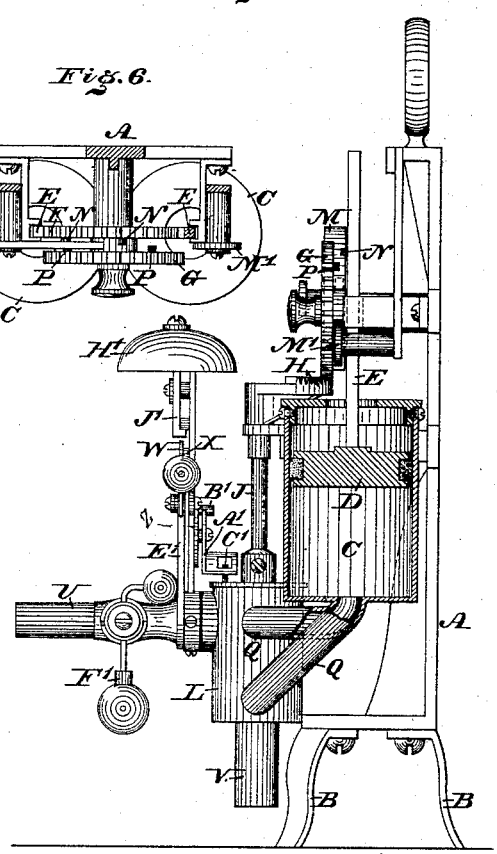
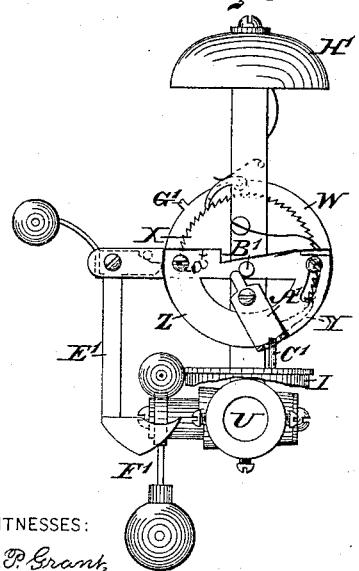
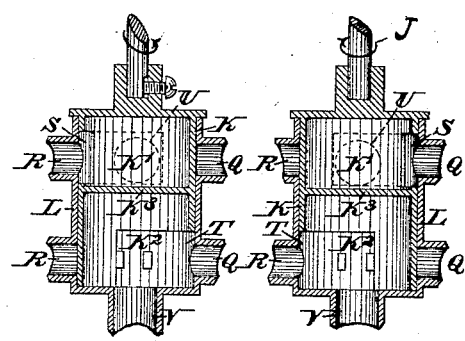
WITNESSES:
A. P. Grant
H. F. Kircher
INVENTORS:
Edward Kronenberg
Charles Wolters
BY John A. Wiedersheim
ATTORNEY.

UNITED STATES PATENT OFFICE.

EDWARD KRONENBERG AND CHARLES WOLTERS, OF PHILADELPHIA, PA.

LIQUID-METER.

SPECIFICATION forming part of Letters Patent No. 327,956, dated October 6, 1885.

Application filed April 20, 1885. Serial No. 162,806. (No model.)

*To all whom it may concern:*

Be it known that we, EDWARD KRONENBERG and CHARLES WOLTERS, both citizens of the United States, residing in the city and county of Philadelphia, State of Pennsylvania, have invented a new and useful Improvement in Liquid Measures or Gages, which improvement is fully set forth in the following specification and accompanying drawings, in which—

Figure 1 represents a front view of a liquid measure or gage embodying our invention. Fig. 2 represents a partial side elevation and partial vertical section thereof. Fig. 3 represents a rear view of the front portion thereof on an enlarged scale. Figs. 4 and 5 represent vertical sections of the valve of the apparatus on an enlarged scale. Fig. 6 represents a horizontal section in line $x$ $x$, Fig. 1.

Similar letters of reference indicate corresponding parts in the several figures.

Our invention consists of an automatic measure or gage for liquids, the several novel parts thereof being hereinafter fully described, and made the subject of definite claims.

Referring to the drawings, A represents a frame, which supports the working parts of the apparatus, the same being properly supported on a stand or feet, B.

C C represent cylinders or chambers, arranged side by side, containing pistons D, the stems E of which, passing through the heads of the cylinders, are of the form of rack-bars, the same meshing with opposite sides of a pinion or toothed wheel, F, which is supported on the frame A. On the shaft of said pinion, and rotating thereon, is a pinion or toothed wheel, G, which engages with a segmental rack, H, whose shaft or bearing is connected with the stem J of a rotary valve, K, the valve-chamber or shell L whereof is properly mounted adjacent to the cylinders C.

M represents a weighted arm, which is properly mounted on the axis of the wheels F G, interposed between said wheels, and adapted to be engaged by pins N on the wheel F and strike pins P on the wheel G, said pins being in pairs located on the inner faces of the wheels F G, whereby said arm may be raised by the wheel F at one side of the apparatus and thrown to the opposite side, and in its motion strike one of the pins of the wheel G, thus imparting rotation to the latter, and consequently, by means of the segment H, rotating the valve K, it being noticed that the wheel F is rotated by the motions of the racks E, due to the fluid admitted into the cylinders C, as will be hereinafter more fully set forth. Connected with opposite sides of the valve-chamber L and bottom of the cylinders are pipes Q Q and R R, it being noticed that the rotary valve K is of cylindrical form, and is divided into chambers K' K² by means of the diaphragm K³, the upper chamber having a port, S, which may be placed in communication with either of the upper pipes, Q R, and the lower chamber having a port, T, which may be placed in communication with either of the lower pipes Q R.

U represents a pipe for the entrance of the fluid into the valve-chamber L, the same opening into the upper part of the valve K.

V represents the exit-pipe opening into the lower part thereof.

The operation is as follows, the valve being in position shown in Fig. 5: The fluid enters the upper chamber of the valve K from the pipe U and passes through the port S and upper pipe Q into one of the cylinders C, in the present case the one on the right side of Fig. 1, thus raising the piston D of said cylinder, and consequently the rack connected therewith, and imparting rotation to the pinion F, it being evident that the rack and piston of the other cylinder are lowered by the rotation of said pinion F. As the pin N rotates with the pinion F it raises the arm M, and when the latter has passed its center it is forcibly thrown to the left side, in which motion it strikes one of the pins P on the wheel G, imparting a rapid rotation to said wheel G, whereby the valve K is shifted, thus closing the upper pipe Q and placing the port S in communication with the upper pipe R, whereby the fluid enters said pipe R, and is thereby directed to the cylinder C on the left side of Fig. 1. The port T is now in communication with the lower pipe Q, whereby the fluid leaves the right-hand cylinder C, enters the lower pipe Q, passes through the port T of the valve K, and is thus discharged through the exit-pipe V. (See Fig. 4.) Meanwhile the left-hand cylinder is being supplied with fluid, whereby its piston raises and the rack thereof rotates the pinion F in the opposite direction to that previously described. The pin N of the pinion F, which is below the arm M, rises with said pinion, engages with said arm, and raises the same until it has passed its center, when it is thrown forcibly to the right and strikes the other pin P of the wheel G, the effect of which is to impart rotation to said pinion G, and thus shift the valve from the position shown in Fig. 4 to that shown in Fig. 5, the result being the discharge of the fluid in the left-hand cylinder and the replenishing of the right-hand cylinder, and these operations are continued until the supply of fluid is exhausted or ceases. Now, as the cylinders are of known capacity, the amount of fluid passed into and discharged therefrom will be measured by a register connected with the apparatus, which in the present case is formed of a rotating dial, W, to which is attached a ratchet, X, the latter being operated by the pawl or tooth Y, which is so attached to a segmental plate, Z, that it engages with each successive tooth of the said ratchet X at each completed motion of the said segmental plate Z, which latter is suitably pivoted, as at $a^x$, to the adjacent frame, and, as shown in Fig. 3, is of the form of a semicircular disk having an opening, the latter allowing the passage through the same of the pin or screw of the arm A' and permitting the rising and falling motions of the plate Z on the pivot $a^x$. An arm, A', is also pivoted to the frame adjacent to the segmental piece Z, having its upper end adapted to engage with the projection or stud B' on the segmental piece Z, so that as said arm A' is moved it turns the piece Z, carrying with it the tooth or pawl Y, whereby the ratchet X is moved the distance of one tooth for each motion of the valve, and the dial of the register indicates the quantity admitted into and discharged from each cylinder C. The arm A' is moved in opposite directions by the pin or stud C' rising from the head of the rotary valve K, it being evident that as the said valve is rotated it causes the operation of the register.

D' represents the index or pointer of the register, the same being connected to a suitable support adjacent to the register, to which support is pivoted a weighted arm, E', of angular form, the lower limb of which is adapted to support a weighted arm, F', on the plug of the valve of the inlet-pipe U.

On the periphery of the dial is a toe, G', so disposed that when the amount of fluid required has passed into the meter it strikes the upper limb of the arm E', thus forcing out the lower limb thereof, which was under and supporting the weighted arm F', thus releasing the said arm, whereby the plug of the valve in the induction-pipe is closed, and the supply of fluid to the valve K ceases.

The dial W may be readily set to measure a predetermined quantity by simply turning the same until the number which coincides with the said quantity registers with the index-finger D'.

Adjacent to the dial is a bell or gong, H', the hammer J' of which is so disposed that it is struck by the toe G', warning the operator that the measurement approaches completion, so that he may be present when the full amount is measured, failing in which the toe strikes the upper limb of the arm E', and causes the automatic stoppage of the supply of fluid to the apparatus, as hereinbefore set forth.

To the upper part of the frame of the apparatus are secured buffers M', so disposed that when the arm M is thrown in either direction it strikes said buffers, and its blow is accordingly eased.

Having thus described our invention, what we claim as new, and desire to secure by Letters Patent, is—

1. Two or more cylinders provided with pistons having stems with racks thereon, in combination with a pinion meshing with said stems, a loosely-mounted pinion, and a weighted arm, said pinions being mounted on the same shaft, and having pins or projections, substantially as described, whereby said weighted arm is thrown in opposite directions and caused to rotate or oscillate the said loosely-mounted pinion, and thereby operate the valve of the apparatus in opposite directions.

2. The cylinders C C, having pistons with stems E, in combination with a shaft-carrying pinion, F, and loosely-mounted pinion G, the said pinions F and G having pins N and P, respectively, weighted arm M, and buffers M', substantially as described.

3. The pinions F and G, having pins N and P, respectively, in combination with the weighted arm M, segmental rack H, and rotary valve K, having stem J, said parts being arranged and combined substantially as described.

4. In a measuring apparatus, a register having a rotary dial, in combination with operating mechanism consisting of a ratchet, a pivoted plate, a pivoted arm actuating said plate, and a connection with the valve of the apparatus, substantially as described.

5. In a measuring apparatus, an automatic cut-off for the inlet or supply pipe, consisting of an arm for supporting the plug of a valve, said plug being self-closing, and a toe or projection on the register for tripping said arm and releasing the plug of the valve, whereby the latter closes, substantially as described.

6. In a measuring apparatus, a self-closing supply-valve and arm supporting the same, a bell and a projection on the rotary part of the register combined, substantially as described, whereby said gong will be sounded in advance of the completion of the measurement, and the valve closed at said completion, as stated.

7. The pinion F, having pins N, in combination with weighted arm M, the pinion G, having pins P, and loosely mounted on the shaft of the pinion F, segmental rack H, meshing with pinion G, and rotary valve K, having stem J, attached to said segmental rack, substantially as and for the purpose set forth.

EDWARD KRONENBERG.
CHAS. WOLTERS.

Witnesses:
 JOHN A. WIEDERSHEIM,
 A. P. GRANT.